US009078390B2

(12) United States Patent
Aposhian et al.

(10) Patent No.: US 9,078,390 B2
(45) Date of Patent: Jul. 14, 2015

(54) CONVEYOR SYSTEM FOR CONTROLLING SPACING BETWEEN SOD SLABS

(71) Applicants: Steven R. Aposhian, Farmington, UT (US); Eric E. Aston, Salt Lake City, UT (US); William M. Decker, Salt Lake City, UT (US); Samuel Drake, Cottonwood Heights, UT (US)

(72) Inventors: Steven R. Aposhian, Farmington, UT (US); Eric E. Aston, Salt Lake City, UT (US); William M. Decker, Salt Lake City, UT (US); Samuel Drake, Cottonwood Heights, UT (US)

(73) Assignee: Firefly Equipment, LLC, Farmington, UT (US)

( * ) Notice: Subject to any disclaimer, the term of this patent is extended or adjusted under 35 U.S.C. 154(b) by 161 days.

(21) Appl. No.: 13/851,402

(22) Filed: Mar. 27, 2013

(65) Prior Publication Data

US 2013/0259629 A1 Oct. 3, 2013

Related U.S. Application Data

(60) Provisional application No. 61/619,411, filed on Apr. 2, 2012.

(51) Int. Cl.
| | | |
|---|---|---|
| *A01B 45/04* | (2006.01) | |
| *B65G 47/31* | (2006.01) | |
| *B65H 5/22* | (2006.01) | |
| *B65G 15/58* | (2006.01) | |
| *A01G 1/00* | (2006.01) | |

(52) U.S. Cl.
CPC ............. *A01B 45/045* (2013.01); *B65G 47/31* (2013.01); *A01G 1/002* (2013.01); *B65G 15/58* (2013.01); *B65H 5/224* (2013.01)

(58) Field of Classification Search
USPC ............... 172/19, 20; 198/419.2, 429, 460.1, 198/460.3, 461.1; 270/52.09; 414/437, 414/788.1, 789.7, 791.6, 792, 792.5, 792.6, 414/792.7, 792.8, 792.9, 793, 794.4, 799, 414/900, 902, 933; 83/236, 94
See application file for complete search history.

(56) References Cited

U.S. PATENT DOCUMENTS

| | | | | |
|---|---|---|---|---|
| 3,757,966 | A * | 9/1973 | Cox et al. .................. | 414/792.1 |
| 4,162,709 | A * | 7/1979 | Wilson ........................... | 172/20 |
| 4,518,075 | A * | 5/1985 | Aykut et al. ................ | 198/460.1 |
| 4,534,462 | A * | 8/1985 | Hoover et al. ........... | 198/781.06 |
| 4,892,152 | A * | 1/1990 | van Vuuren ..................... | 172/20 |
| 4,991,708 | A * | 2/1991 | Francioni .................... | 198/419.2 |
| 5,123,231 | A * | 6/1992 | Fallas et al. .................... | 53/493 |
| 5,217,078 | A * | 6/1993 | Zinn ............................... | 172/19 |
| 5,505,291 | A * | 4/1996 | Huang et al. ............... | 198/460.3 |
| 5,971,134 | A * | 10/1999 | Trefz et al. ................ | 198/460.1 |
| 6,296,063 | B1 | 10/2001 | Tvetene | |
| 6,364,027 | B1 | 4/2002 | Tvetene | |
| 6,540,063 | B1 * | 4/2003 | Fallas et al. ............... | 198/461.1 |
| 6,681,864 | B2 | 1/2004 | Tvetene | |
| 6,783,318 | B2 | 8/2004 | Tvetene | |
| 7,063,206 | B2 * | 6/2006 | Haan et al. ............... | 198/781.05 |
| 7,641,437 | B1 | 1/2010 | Tvetene | |
| 7,721,814 | B2 | 5/2010 | Brouwer | |
| 7,740,083 | B2 | 6/2010 | Tvetene | |

(Continued)

*Primary Examiner* — Gregory Adams
(74) *Attorney, Agent, or Firm* — Kirton McConkie; Brian Tucker

(57) ABSTRACT

The present invention extends to a conveyor system that allows the spacing between slabs on a conveyor to be controlled. Because the spacing can be controlled, a single stacking head can be used to pick up and stack multiple slabs at the same time. In this manner, a harvesting machine employing the conveyor system of the present invention can utilize a single stacking head while still harvesting sod at least as quickly as harvesting machines employing multiple stacking heads.

20 Claims, 6 Drawing Sheets

(56) References Cited

U.S. PATENT DOCUMENTS

| | | | |
|---|---|---|---|
| 7,896,151 B2* | 3/2011 | Meisinger | 198/419.2 |
| 2005/0058527 A1 | 3/2005 | Tvetene | |
| 2006/0102363 A1* | 5/2006 | Tvetene et al. | 172/20 |
| 2006/0185860 A1* | 8/2006 | Brouwer et al. | 172/19 |
| 2008/0101911 A1* | 5/2008 | Hulchanski | 414/793 |

* cited by examiner

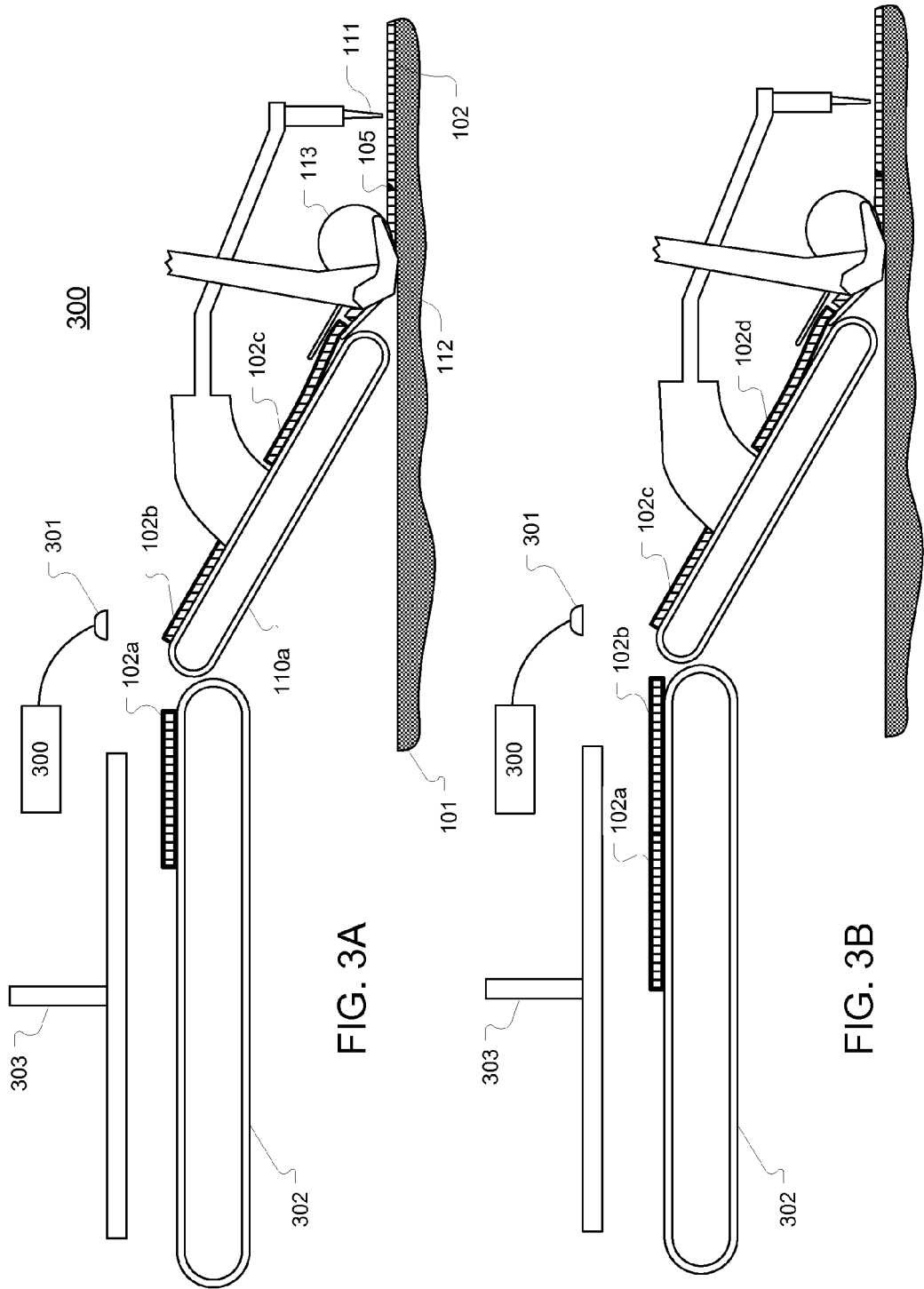

CONVEYOR SYSTEM FOR CONTROLLING SPACING BETWEEN SOD SLABS

CROSS-REFERENCE TO RELATED APPLICATIONS

This application claims the benefit of U.S. Provisional Patent Application No. 61/619,411, filed Apr. 2, 2012, titled Slab Spacing Control of the Conveyor for Automated Turf Harvesting.

BACKGROUND

Turf grass (sod) is a living organism that must be handled properly to ensure its survival when it is removed from one location and transplanted to another. Sod is generally harvested using large machinery that cuts slabs of sod from the soil and stacks them on pallets. The speed at which a machine can stack slabs often determines the speed at which the machine can harvest sod.

FIG. 1 illustrates a portion of a sod harvesting machine 100 that includes a typical cutting head, conveyor system, and stacking system. The cutting head of FIG. 1 includes a first blade 111, a second blade 112, and a roller 113. Blade 111 is periodically lowered into the sod to make vertical cuts defining an initial width of the slabs. Blade 112 oscillates back and forth underneath the sod to sever the slab from the underlying soil. Roller 113 applies pressure to the sod as it is cut to facilitate the cutting of clean slabs.

Slabs cut by the cutting head are routed to conveyor 110a which lifts the slabs up to conveyor 110b. Before the slabs reach conveyor 110b, they are cut in half by a third blade 114. For example, a slab is cut into two slabs 102a, 102b of equal width. The two slabs 102a, 102b then pass on to conveyor 110b which positions the slabs underneath stacking head 120a. Stacking head 120a descends to the slabs, picks them up (e.g. via hooks), moves overtop a pallet, and drops the slabs on the pallet. This process continues until a pallet is filled.

To provide adequate spacing between each slab that is cut by blade 112 (as well as to facilitate cutting of slabs by blade 112), conveyor 110a is rotated at a rate that is faster than the speed at which the harvesting machine (e.g. a tractor) travels. In this way, a gap is created between each piece on conveyor 110a thus providing the necessary time for stacking head 120a to travel back and forth between conveyor 110b and the pallet.

This gap, however, necessitates the use of blade 114 because otherwise, the spacing between two slabs would be too great for stacking head 120a to pick up multiple slabs. To address this, the slabs are initially cut to have a width double that of the intended size. The wider slabs are then cut in two by blade 114 to create two side by side slabs. These side by side slabs are then picked up and stacked. Accordingly, the rate at which stacking head 120a can pick up slabs limits the rate at which slabs can be cut from the soil.

To address this limit, harvesting machines with multiple stacking heads have been designed. FIG. 2 illustrates an example of a harvesting machine 200 having two stacking heads 120a and 120b. Because harvesting machine 200 has two stacking heads 120a, 120b, there is no need for blade 114. In other words, each stacking head can pick up a single slab, and therefore, the two stacking heads do not need to pick up slabs in unison. Therefore, the use of two stacking heads accounts for the gap that exists between slabs on conveyor 110a.

Stacking heads 120a, 120b are configured to descend to conveyor 110b at the moment when a slab is underneath the stacking head, to pick up the slab (e.g. via hooks), and to stack the slabs on a pallet. For example, as shown in FIG. 2, stacking head 120a has picked up slab 102a, and stacking head 120b is waiting until slab 102b is positioned directly below the head at which point stacking head 120b will descend to pick up slab 102b and stack it. The use of multiple stacking heads allows sod to be cut at a quicker rate than when a single stacking head is used in conjunction with blade 114. However, using multiple stacking heads is more complex, expensive, and requires more frequent maintenance.

BRIEF SUMMARY

The present invention extends to a conveyor system that allows the spacing between slabs on a conveyor to be controlled. Because the spacing can be controlled, a single stacking head can be used to pick up and stack multiple slabs at the same time. In this manner, a harvesting machine employing the conveyor system of the present invention can utilize a single stacking head while still harvesting sod at least as quickly as harvesting machines employing multiple stacking heads.

In one embodiment, the invention is implemented as a conveyor system for a sod harvesting machine, or as a sod harvesting machine having a conveyor system. The conveyor system includes a first conveyor, a second conveyor positioned to carry spaced slabs of sod to the first conveyor, a stacking head positioned over a portion of the first conveyor, a control unit for controlling the stacking head and the position of the first conveyor, and one or more sensors for detecting the position of the slabs of sod. The control unit causes the first conveyor to advance in a manner that reduces the spacing between two or more slabs when the slabs are positioned on the first conveyor thereby allowing the two or more slabs to be simultaneously removed from the first conveyor by the stacking head.

In another embodiment, the present invention is implemented as a conveyor system for a sod harvesting machine having a first conveyor and a control unit. The first conveyor is positioned adjacent to a second conveyor. The second conveyor is positioned to receive slabs of sod cut from the soil and to carry the slabs to the first conveyor. The second conveyor rotates at a speed that is faster than the ground speed of the sod harvesting machine thereby causing spacing between consecutive slabs. The control unit reduces the spacing between consecutive slabs when the consecutive slabs enter onto the first conveyor by controlling a speed at which the first conveyor is advanced thereby allowing two or more consecutive slabs to be simultaneously removed from the first conveyor by a single stacking head This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3F illustrate a conveyor system according to one or more embodiments of the invention.

DETAILED DESCRIPTION

The present invention extends to a conveyor system that allows the spacing between slabs on a conveyor to be controlled. Because the spacing can be controlled, a single stacking head can be used to pick up and stack multiple slabs at the same time. In this manner, a harvesting machine employing the conveyor system of the present invention can utilize a single stacking head while still harvesting sod at least as quickly as harvesting machines employing multiple stacking heads.

In one embodiment, the invention is implemented as a conveyor system for a sod harvesting machine, or as a sod harvesting machine having a conveyor system. The conveyor system includes a first conveyor, a second conveyor positioned to carry spaced slabs of sod to the first conveyor, a stacking head positioned over a portion of the first conveyor, a control unit for controlling the stacking head and the position of the first conveyor, and one or more sensors for detecting the position of the slabs of sod. The control unit causes the first conveyor to advance in a manner that reduces the spacing between two or more slabs when the slabs are positioned on the first conveyor thereby allowing the two or more slabs to be simultaneously removed from the first conveyor by the stacking head.

Figure 1:
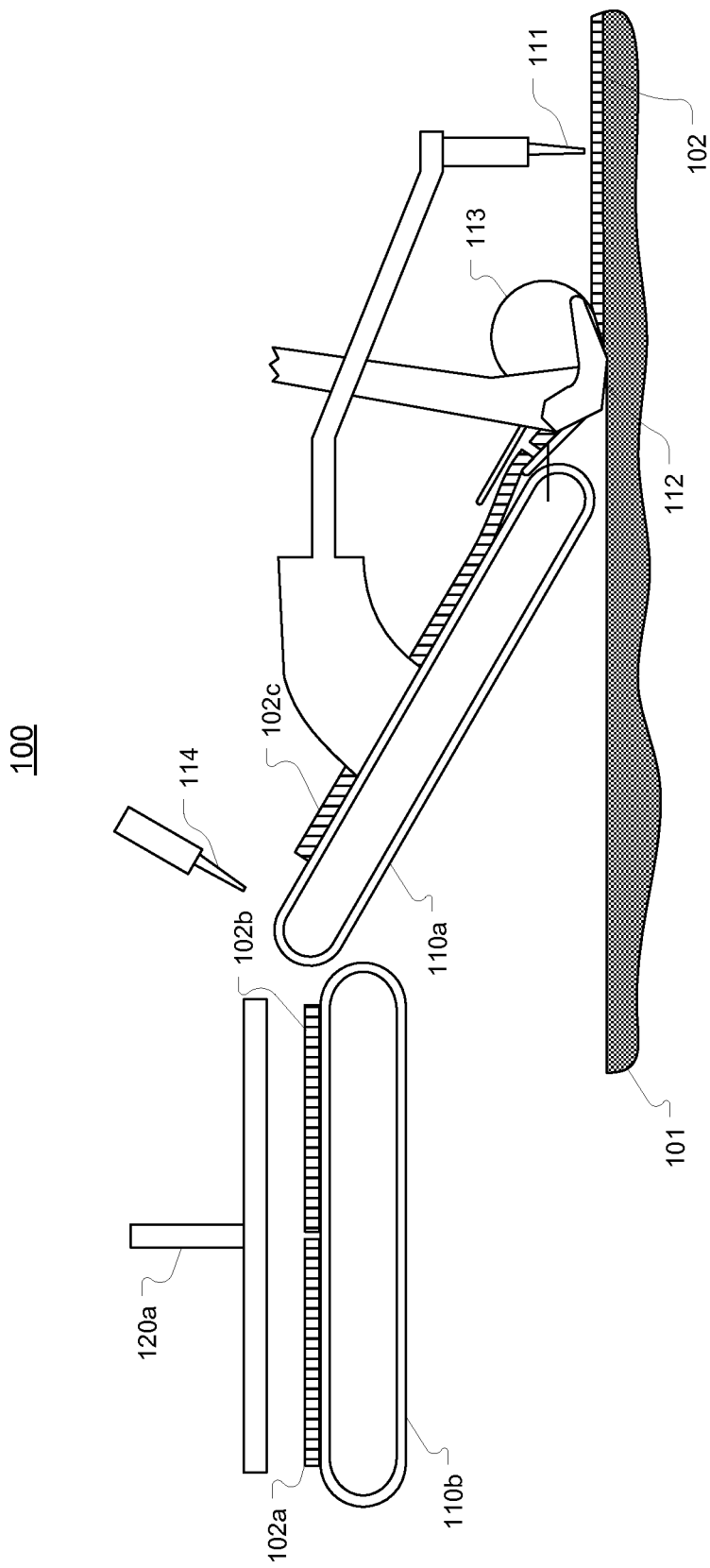
FIG. 1 illustrates a prior art conveyor system that employs a single stacking head.
Figure 2:
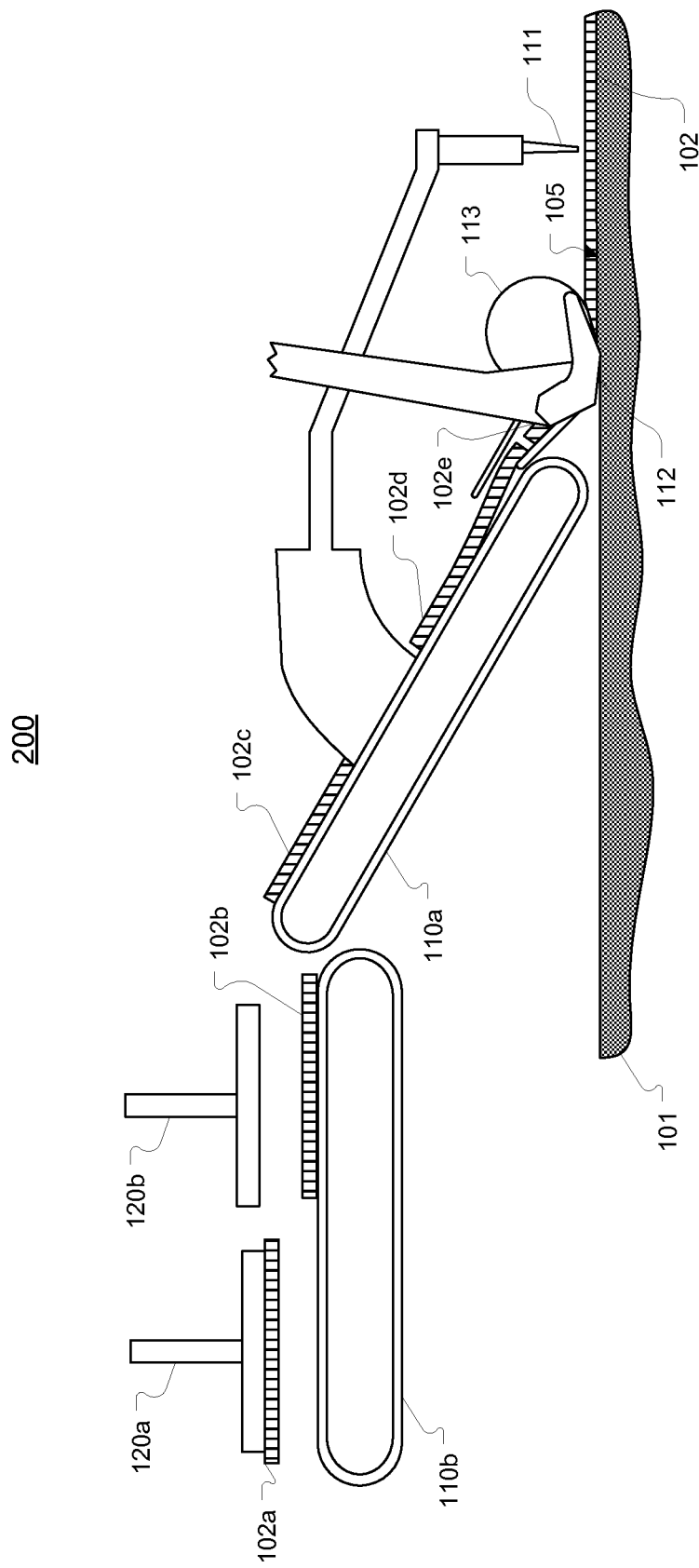
FIG. 2 illustrates a prior art conveyor system that employs multiple stacking heads.

In another embodiment, the present invention is implemented as a conveyor system for a sod harvesting machine having a first conveyor and a control unit. The first conveyor is positioned adjacent to a second conveyor. The second conveyor is positioned to receive slabs of sod cut from the soil and to carry the slabs to the first conveyor. The second conveyor rotates at a speed that is faster than the ground speed of the sod harvesting machine thereby causing spacing between consecutive slabs. The control unit reduces the spacing between consecutive slabs when the consecutive slabs enter onto the first conveyor by controlling a speed at which the first conveyor is advanced thereby allowing two or more consecutive slabs to be simultaneously removed from the first conveyor by a single stacking head FIGS. 3A-3F illustrate a conveyor system according to one or more embodiments of the invention. FIGS. 3A-3F use the same reference numbers to refer to common components shown in FIGS. 1 and 2. The conveyor system of the present invention includes a control unit 300, a sensor 301, a conveyor 302, and a stacking head 303. The remaining components can function in the same manner as described with reference to FIGS. 1 and 2. Although conveyor 110a is shown in the Figures as a single conveyor, conveyor 110a can equally be comprised of multiple conveyors.

Control unit 300 controls the advancing of conveyor 302 based on signals received from sensor 301. Although a single sensor is described in this description, it is to be understood that multiple sensors can be used. Sensor 301 detects the presence of a slab (i.e. it sends a signal to control unit 300 indicating that a slab has been detected).

When sensor 301 notifies control unit 300 of the presence of a slab, control unit 300 generates control signals for advancing conveyor 302 an appropriate amount. As better shown in FIG. 4 and further described below, conveyor 302 is advanced until the slab is positioned fully on conveyor 302. FIG. 3A represents the position of conveyor 302 after it has been advanced to accommodate slab 102a. Conveyor 302 can be stopped in the position shown in FIG. 3A to wait for the next approaching slab (slab 102b).

FIG. 3B illustrates that, as slab 102b approached, control unit 300 caused conveyor 302 to begin advancing at the moment that slab 102b reached slab 102a. Conveyor 302 continued to advance until slab 102b is fully contained on conveyor 302 as shown in FIG. 3B. In other words, control unit 300 advances conveyor 302 incrementally each time a slab approaches so that the slabs abut each other (or are closely spaced).

Figure 3C:
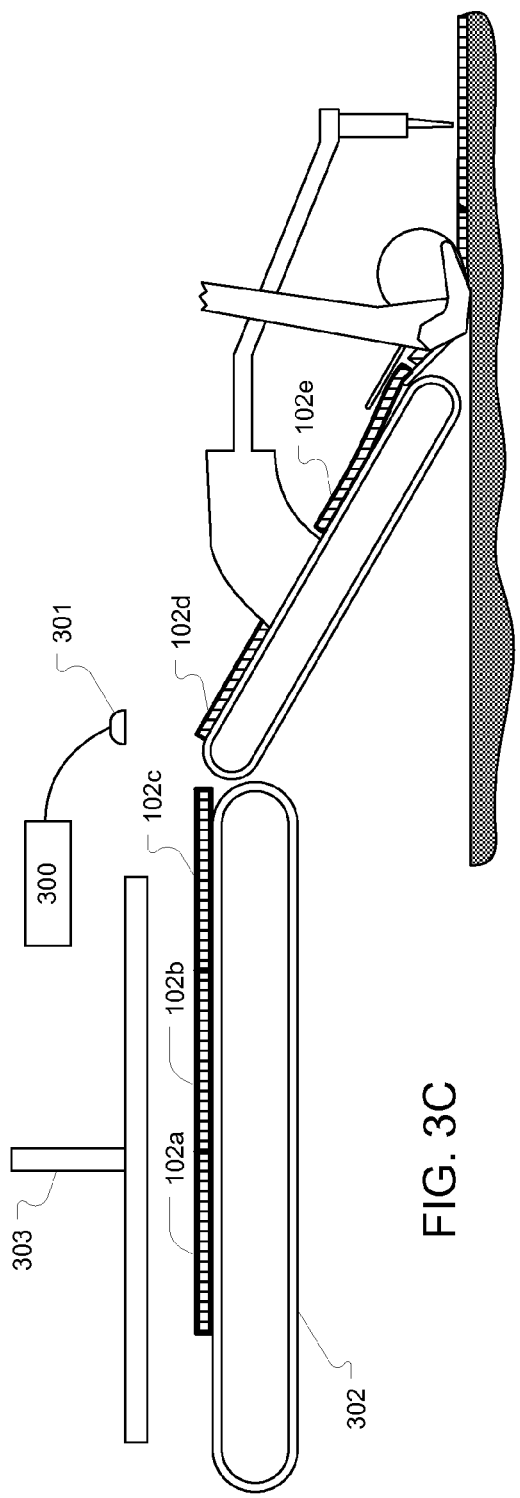
Figure 3D:
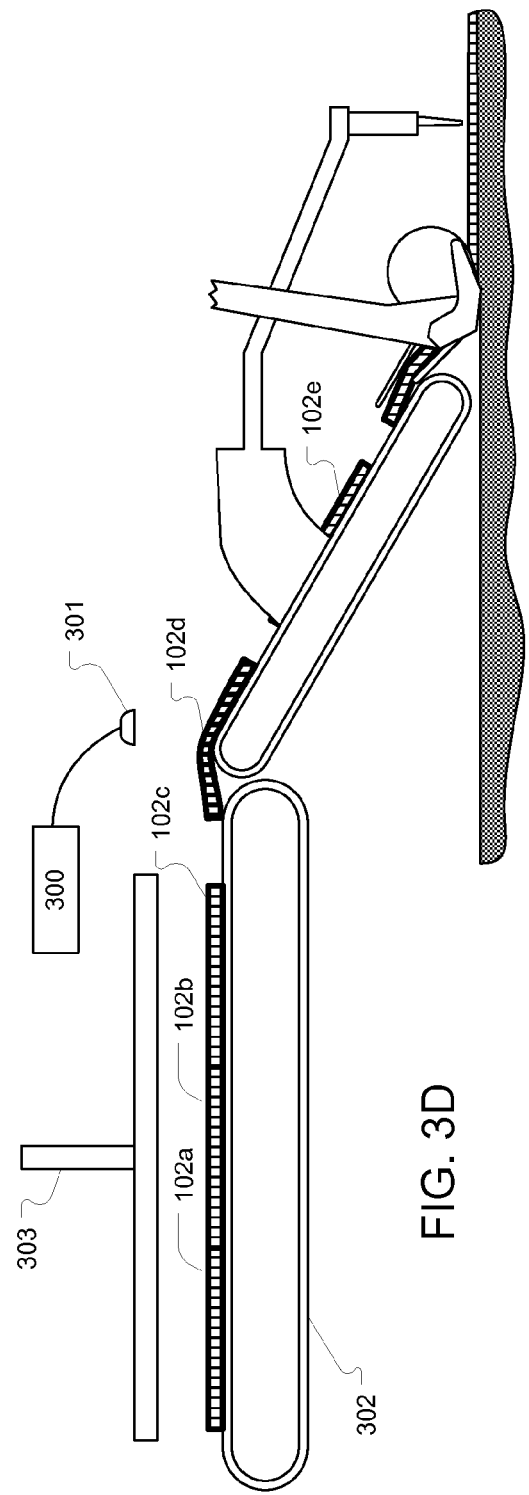
Figure 3E:
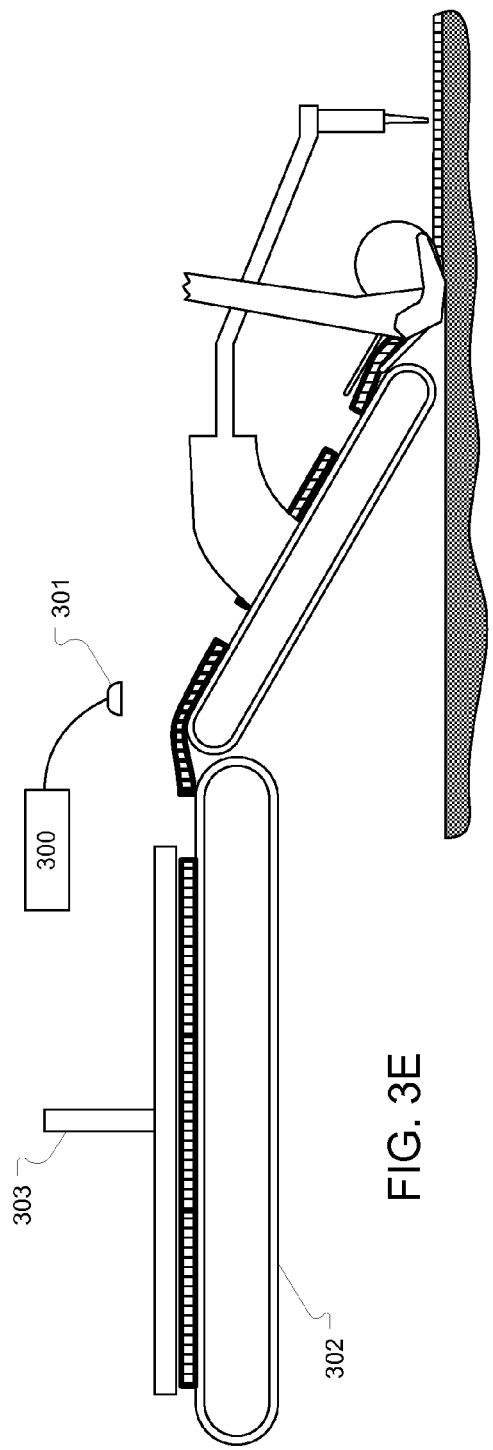
Figure 3F:
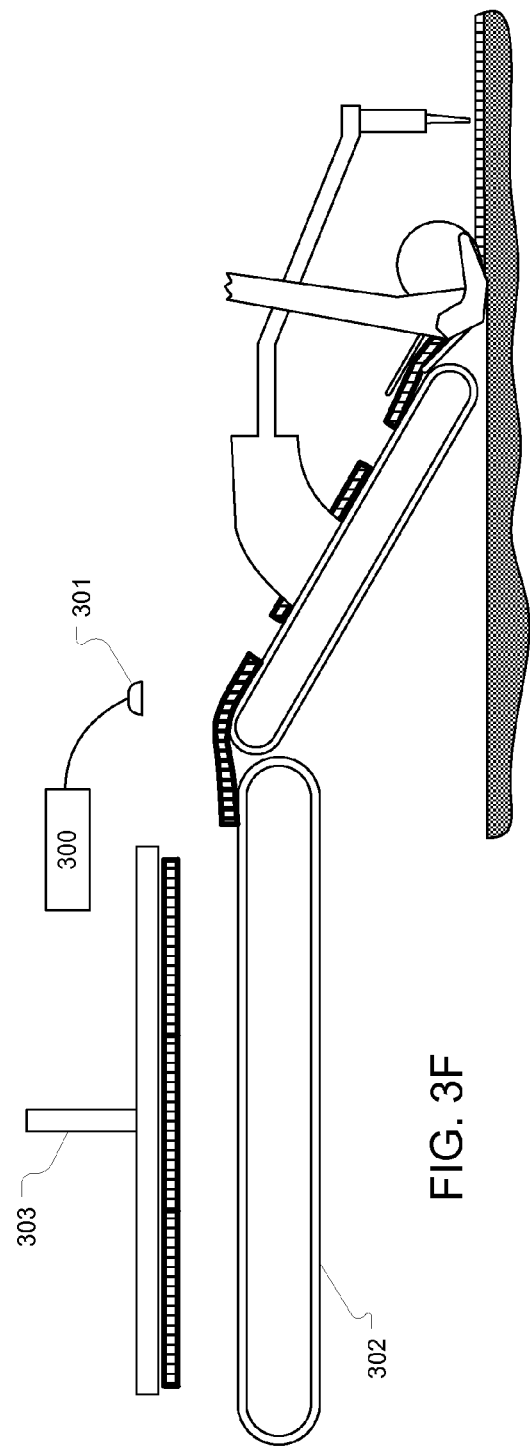

FIG. 3C illustrates that the conveyor is advanced in the same manner to accommodate the third slab 102c. However, in this example, once three slabs are positioned on conveyor 302, the slabs are advanced to be directly underneath stacking head 303 as shown in FIG. 3D. At this point, stacking head 303 quickly descends to pick up the three slabs as shown in FIG. 3E. Conveyor 302 may or may not be stopped while the three slabs are picked up. Once the slabs are picked up, conveyor 302 can be advanced to accommodate the next slab as shown in FIG. 3F.

Although FIG. 3E depicts stacking head 303 descending to pick up the slabs, the present invention can equally be implemented when conveyor 302 is raised to stacking head 303. Accordingly, the present invention is not limited to any particular manner in which stacking head 303 picks up the slabs.

Stacking head 303 can be configured to pick up slabs quickly as soon as they are in the appropriate position. In this manner, there is no need to slow the speed at which the sod harvesting machine is running. In other words, conveyor 110a can continue to rotate at the same speed during the entire process depicted in FIGS. 3A-3F because the three slabs can be positioned under stacking head 303 and removed from conveyor 302 during the time that the next slab advances on conveyor 110a to conveyor 302. In this manner, the sod harvesting machine can be run at significantly higher speeds than in prior art approaches which employ a single stacking head. Further, the single stacking head design of the present invention is simpler and more durable than prior multiple stacking head designs.

The above example describes a scenario where three slabs are simultaneously picked up. However, different numbers of slabs could be picked up in the same manner (e.g. depending on the width of the slabs with respect to the stacking head and/or pallet on which the slabs are to be stacked). For example, the conveyor system of the present invention could commonly be used to simultaneously pick up two slabs.

In some embodiments, control unit 300 can be configured to adaptively advance conveyor 302 based on the width of a particular slab. For example, sensor 301 can provide a signal while a slab is detected. While this signal is received (or in relation to a time period while the signal is received), control unit 300 can advance conveyor 302. In this way, slabs of different width will still be advanced the appropriate distance. Alternatively, control unit 300 can be configured to advance conveyor 302 a set distance each time a slab is detected, although this approach will often be less desirable due to the occurrence of slabs of different widths.

Control unit 300 can also be configured to track the width of a slab to better track when a sufficient number of slabs have been accumulated on conveyor 302. In other words, rather than advancing conveyor 302 to the pickup position each time the appropriate number of slabs have been accumulated (e.g. 3 slabs), control unit 300 can track the total width of the accumulated slabs. For example, control unit 300 can use the signal provided by sensor 301 to determine the width of each slab. Control unit 300 can calculate a total width of slabs that have been accumulated such that when the total width exceeds a threshold, conveyor 302 is advanced to the pickup position.

One benefit of tracking the total width of slabs that have been accumulated is that control unit 300 can dynamically adjust to slabs of different widths. For example, in some cases, the back end of a slab may not be completely cut such that the slab and the subsequent slab remain intact. In this case, the slab will appear as a single slab having double the width of other slabs. Control unit 300 can detect that the slab is double the width and update the total width of accumulated slabs accordingly.

For example, if one slab is already accumulated when the double width slab approaches and three slabs are stacked at a time, control unit 300 can determine that, with the addition of the double width slab, the total width of accumulated slabs exceeds the threshold. Control unit 300 can then advance conveyor 302 to allow the slabs to be picked up. In this way, although control unit 300 has only detected two slabs (i.e. one normal width slab and one double width slab), control unit 300 can still advance conveyor 302 when the appropriate total width of slabs has been reached.

Similarly, using the same example, if two slabs have already been accumulated when the double width slab is approaching, control unit 300 can cause conveyor 302 to advance sufficiently that the first accumulated slab falls off the back of conveyor 302 while the second slab and the double width slab are positioned to be picked up.

Figure 4:
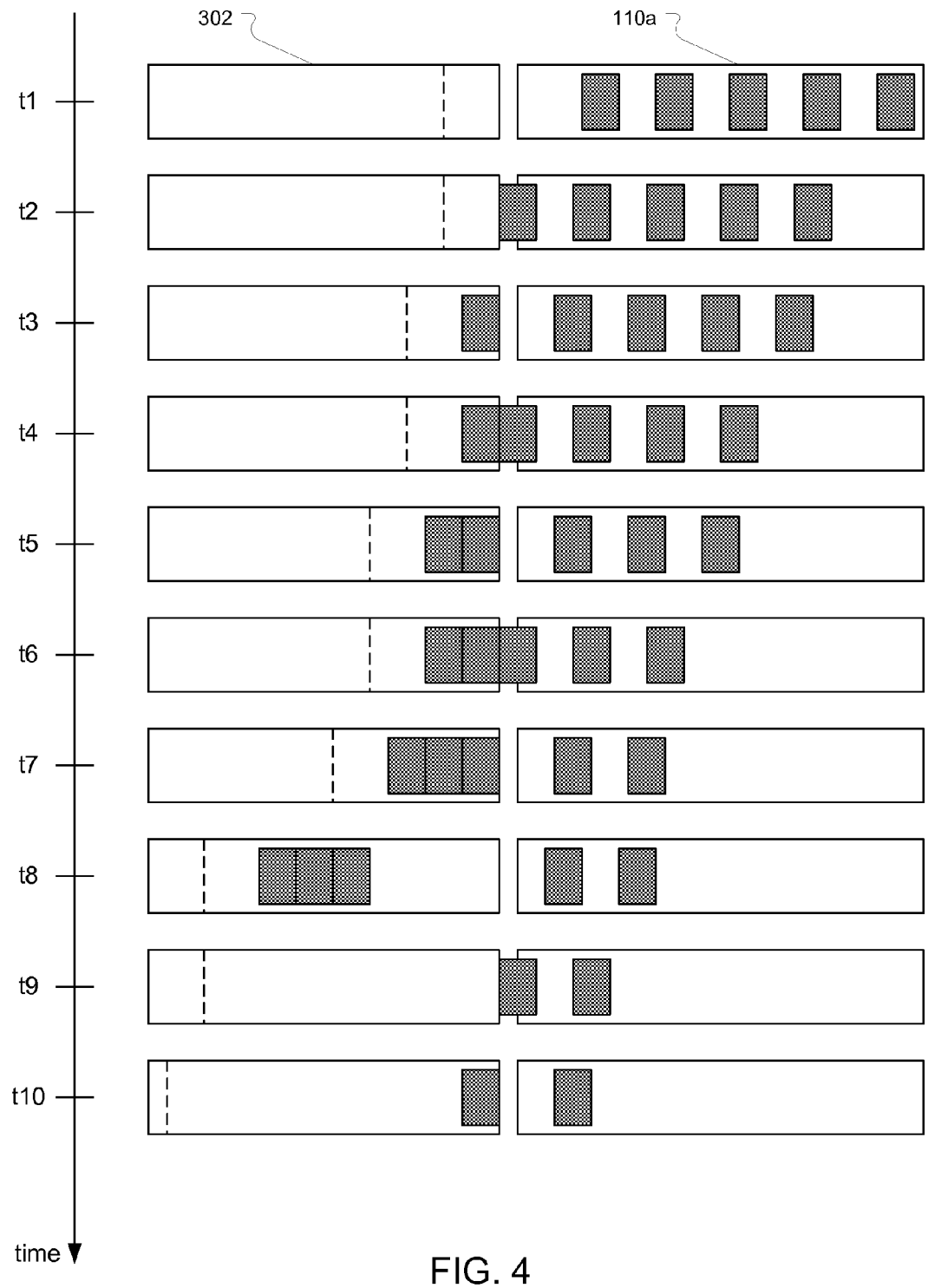
FIG. 4 illustrates the progression of exemplary conveyors of a conveyor system according to one or more embodiments of the invention.

FIG. 4 illustrates the progression of conveyors 302 and 110*a* over a time period t1-t10. At time t1, conveyor 302 remains stationary awaiting the approaching slabs on conveyor 110*a* (however, there is no requirement that conveyor 302 remain stationary at this time since no slabs are positioned on the conveyor). At time t2, the first slab has reached conveyor 302. Time t2 represents the time just before control unit 300 causes conveyor 302 to begin advancing to accommodate the first slab.

Time t3 represents the time right after conveyor 302 has been advanced so that the first slab is fully positioned on the conveyor. Conveyor 302 remains in this position awaiting the next slab. At time t4, the next slab has reached the first slab. In response, at time t5, control unit 300 causes conveyor 302 to again advance to accommodate the next slab where it remains awaiting the third slab.

At time t6, the third slab has reached conveyor 302 and abuts the second slab. Accordingly, control unit 300 causes conveyor 302 to advance as shown at t7. Because three slabs are positioned on conveyor 302 at time t7, conveyor 302 continues to advance until the three slabs are positioned under the stacking head as shown at time t8. In other words, rather than advancing the width of one slab and stopping to await another slab, at time t7, conveyor 302 advances to the position shown at t8 at which point it may stop to allow the three slabs to be picked up.

At time t9, conveyor 302 is shown as being empty because the three slabs have been removed while the fourth slab has continued advancing on conveyor 110*a* to reach conveyor 302. Accordingly, at time t10, conveyor 302 is shown as having advanced to accommodate the fourth slab. This process can continue as necessary.

Although the above examples have described conveyor 302 as being advanced to cause consecutive slabs to abut one another, in some implementations, a small space can be maintained between slabs as desired.

Control unit 300 can be configured to advance conveyor 302 in various ways. For example, sensor 301 can provide a signal indicating when a slab is initially detected and when the slab is no longer detected (i.e. while the slab is under the sensor). During this time or some period related to this time, conveyor 302 can be advanced (e.g. as if the conveyor were moving with the slab). Alternatively, control unit 300 can be programmed with the width of the slabs and automatically advance conveyor 302 the specified width each time a slab is detected by sensor 301. Control unit 300 can adjust the speed at which conveyor 302 is advanced (e.g. by advancing conveyor 302 at the same speed at which conveyor 110*a* is operating, or at a detected speed at which a slab is moving).

In other embodiments, one or more sensors can be used to detect the relative speed and spacing between slabs and advance conveyor 302 accordingly. For example, by receiving input from the one or more sensors, control unit 300 can determine how long it takes for each slab to reach conveyor 302. Conveyor 302 can then be advanced accordingly.

The description above has generally described the advancing of conveyor 302 as comprising advancing and stopping the conveyor. However, conveyor 302 can also be advanced at a speed that allows the next slab to catch up (i.e. a speed slower than conveyor 110*a*'s speed). In other words, conveyor 302's speed can be set such that, by the time the next slab has reached conveyor 302, the previous slab has been advanced so that the back edge of the previous slab will be adjacent to the front edge of the next slab. Whether a continuous slower speed or an advance and stop scheme is employed, control unit 300 can adjust the speed at which conveyor 302 is advanced as necessary.

Also, in some embodiments, control unit 300 can reverse conveyor 302 to close a potential gap between two slabs. For example, if a first slab has advanced past the normal position where the second slab should meet it, control unit 300 can reverse conveyor 302 to return the first slab to the normal position. In some embodiments, it may be desirable to intentionally over-advance conveyor 302 and then reverse it to the normal position. Further, in some embodiments, control unit 300 can dynamically control conveyor 302 in various ways (e.g. using an advance and stop scheme, a continuous slow speed scheme, an advance and reverse scheme, etc.) to best ensure that the slabs are positioned adjacent each other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvesting machine, comprising:
   a cutting head for cutting slabs of sod from the ground as the sod harvesting machine travels across the ground at a ground speed;
   one or more inclined conveyors configured to receive the slabs of sod from the cutting head and deliver the slabs of sod to a stacking conveyor, at least one of the one or more inclined conveyors operating at a first speed that is greater than the ground speed such that a gap is created between adjacent slabs of sof as the slabs of sod are conveyed along the one or more inclined conveyors;
   the stacking conveyor;
   a stacking head configured to remove slabs of sod from the stacking conveyor;
   one or more sensors for detecting the position of the slabs of sod; and
   a control unit for controlling the stacking head and the stacking conveyor based on input from the one or more sensors, the control unit configured to advance the stacking conveyor in a manner that accumulates a plurality of slabs at a front end of the stacking conveypr prior to advancing the stacking conveyor to position the plurality of accumulated slabs underneath the stacking head thereby allowing the plurality of accumulated slabs to be simultaneously removed from the stacking conveyor by the stacking head, the manner comprising:
   for a first slab and any intermediate slab of the plurality of slabs, advancing the stacking conveyor a first distance as the slab reaches the stacking conveyor thereby causing the slab to be positioned on the first conveypr, the first distance being based on a dimension of the slab that trailing edge of the slab is positioned at a front end of the stacking conveyor prior to or as a leading edge of a trailing slab reaches the trailing edge of the slab;
   for a last slab of the plurality of slabs, advancing the stacking conveyor a second distance as the last slab reaches the trailing edge of the immediately preceding slab, the second distance being greater than the first distance, advancing the stacking conveyor the second distance causing the plurality of accumulated slabs to be positioned underneath the stacking head, the stacking conveyor being advanced the second distance at a second speed that is at least as fast as the first speed.

2. The sod harvesting machine of claim 1, wherein the first distance is substantially equal to a width or length of the corresponding slab.

3. The sod harvesting machine of claim 1, wherein the plurality of slabs comprises two slabs.

4. The sod harvesting machine of claim 1, wherein the one or more sensors provide input to the control unit indicative of the relative spacing or relative speed of the slabs on the one or more inclined second conveyors.

5. The sod harvesting machine of claim 1, wherein the one or more sensors provide input to the control unit indicating the presence of a slab at a particular position on the one or more inclined conveyors.

6. The sod harvesting machine of claim 1, wherein after advancing the stacking conveyor the first distance, the stacking conveyor is stopped until the leading edge of the trailing slab reaches the trailing edge of the slab.

7. The sod harvesting machine of claim 1, wherein the second speed is faster than the first speed.

8. The sod harversting machine of claim 1, wherein the second distance is sufficient to cause another slab that is trailing the last slab to be advanced the first distance onto the stacking conveyor.

9. The sod harvesting machine of claim 1, wherein the control unit determines how many slabs are in the plurality of accumulated slabs by tracking the total width of slabs that have been accumulated at the front end of the stacking conveyor.

10. The sod harvesting machine of claim 1, wherein advancing the stacking conveyor the first distance comprises:
    initially advancing the stacking conveyor a third distance that is greater than the first distance to cause the slab to be positioned on the stacking conveyor; and
    reversing the stacking conveyor a fourth distance, a differecne between the third distance and the fourth distacne equaling the fisrt distance.

11. The sod harvesting machine of claim 1, wherein the stacking conveyor is advanced the first distance at a rate that causes the leading edge of the trailing slab to reach the trailing edge of the slab as the stacking conveyor reaches the first distance such that the stacking conveyor is not stopped after advancing the first distance.

12. The sod harvesting machine of claim 11, wherein the second speed is faster than the first speed.

13. A sod harvesting machine comprising:
    a cutting head for cutting slabs of sod from the ground as the sod harvesting machine travels across the ground at a ground speed;
    one or more inclined conveyors configured to receive the slabs of sod from the cutting head and deliver the slabs of sod to a stacking conveyor, at least one of the one or more inclined conveyors operating at a first speed that is greater than the ground speed such that a gap is created between adjacent slabs of sod as the slabs of sod are conveyed along the one or more inclined conveyors;
    the stacking conveyor;
    a stacking head configured to remove slabs of sod from the stacking conveyor;
    one or more sensors for detecting the position of the slabs of sod; and
    a control unit for controlling the stacking head and the stacking conveyor based on input from the one or more sensors, the control unit configured to advance the stacking conveyor in a manner that accumulates a plurality of slabs at a front end of the stacking conveyor prior to advancing the stacking conveyor to position the plurality of accumulated slabs underneath the stacking head thereby allowing the plurality of accumulated slabs to be simultaneously removed from the stacking conveyor by the stacking head, the manner comprising:
    for a first slab and any intermediate slab of the plurality of slabs, advancing the stacking conveyor a first distance corresponding to a width or length of the slab as the slab reaches the stacking conveyor thereby causing the slab to be positioned on the first conveyor with a trailing edge of the slab being positioned at a front end of the stacking conveyor prior to or as a leading edge of a trailing slab reaches the trailing edge of the slab;
    for a last slab of the plurality of slabs, advancing the stacking conveyor a second distance as the last slab reaches a trailing edge of the immediately preceding slab, the second distance being greater than the first distance, advancing the stacking conveyor the second distance causing the plurality of accumulated slabs to be positioned underneath the stacking head.

14. The sod harvesting machine of claim 13, wherein the stacking conveyor is stopped after advancing the second distance.

15. The sod harvesting machine of claim 13, wherein the stacking conveyor is not stopped after advancing the second distance, the second distance being sufficient to cause another slab that is trailing the last slab to be advanced the first distance onto the stacking conveyor.

16. The sod harvesting machine of claim 13, wherein the stacking conveyor is stopped after being advanced the first distance.

17. A sod harvesting machine comprising:
a cutting head for cutting slabs of sod from the ground as the sod harvesting machine travels across the ground at a ground speed;
one or more inclined conveyors configured to receive the slabs of sod from the cutting head and deliver the slabs of sod to a stacking conveyor, at least one of the one or more inclined conveyors operating at a first speed that is greater than the ground speed such that a gap is created between adjacent slabs of sod as the slabs of sod are conveyed along the one or more inclined conveyors;
the stacking conveyor;
a stacking head configured to remove slabs of sod from the stacking conveyor;
one or more sensors for detecting the position of the slabs of sod; and
a control unit for controlling the stacking head and the stacking conveyor based on input from the one or more sensors, the control unit configured to advance the stacking conveyor in a manner that accumulates a plurality of slabs at a front end of the stacking conveyor prior to advancing the stacking conveyor to position the plurality of accumulated slabs underneath the stacking head thereby allowing the plurality of accumulated slabs to be simultaneously removed from the stacking conveyor by the stacking head, the manner comprising:
for a first slab and any intermediate slab of the plurality of slabs, advancing the stacking conveyor a first distance as the slab reaches the stacking conveyor thereby causing the slab to be positioned on the first conveyor, the first distance being based on a dimension of the slab such that a trailing edge of the slab is positioned at a front end of the stacking conveyor prior to a leading edge of a trailing slab reaching the trailing edge of the slab, the stacking conveyor being stopped momentarily after being advanced the first distance;
for a last slab of the plurality of slabs, advancing the stacking conveyor a second distance as the last slab reaches the trailing edge of the immediately preceding slab, the second distance being greater than the first distance, advancing the stacking conveyor the second distance causing the plurality of accumulated slabs to be positioned underneath the stacking head.

18. The sod harvesting machine of claim 17, wherein the stacking conveyor is not stopped after advancing the second distance.

19. The sod harvesting machine of claim 18, the second distance being sufficient to cause another slab that is trailing the last slab to be advanced the first distance onto the stacking conveyor.

20. The sod harvesting machine of claim 17, wherein the stacking conveyor is stopped after advancing the second distance and then advanced the first distance to position a first slab of a subsequent plurality of slabs on the stacking conveyor.

* * * * *